July 26, 1960
L. G. V. LARGELIUS
2,946,548
SUPPORTING CLAMP
Filed Sept. 10, 1956
2 Sheets-Sheet 1
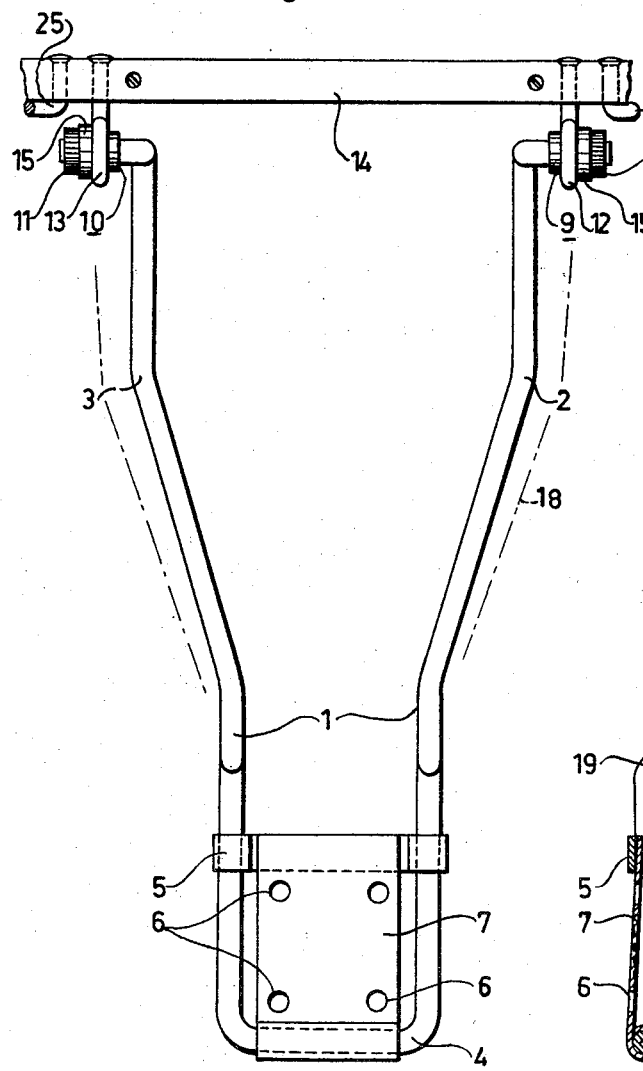
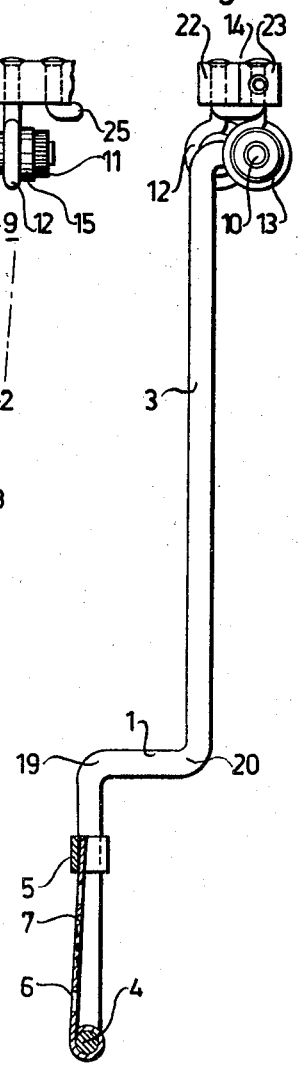

July 26, 1960
L. G. V. LARGELIUS
2,946,548
SUPPORTING CLAMP
Filed Sept. 10, 1956
2 Sheets-Sheet 2
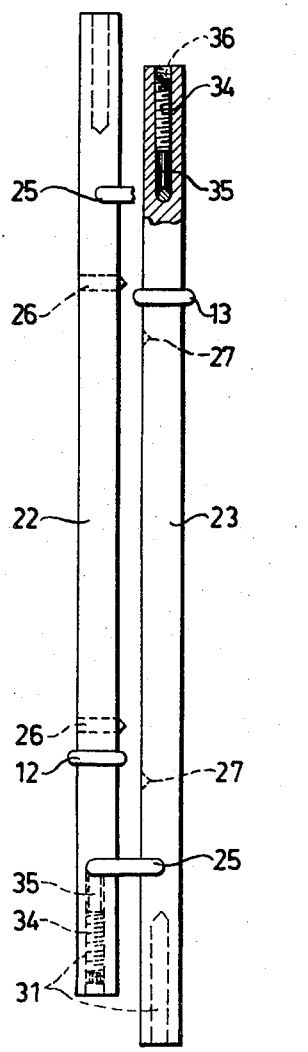
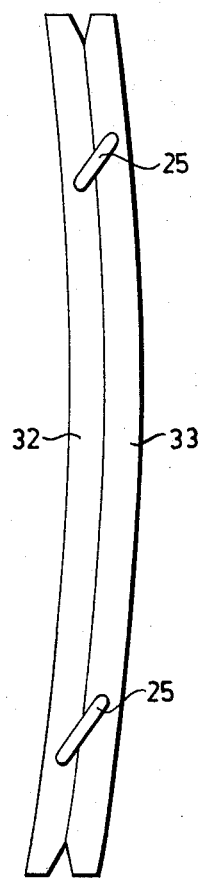
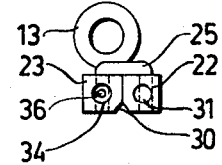
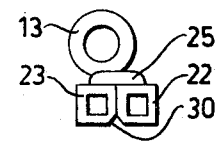
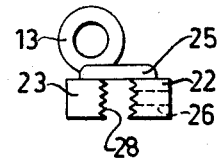
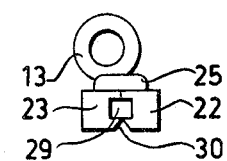

2,946,548
SUPPORTING CLAMP

Lars G. V. Largelius, Nordvalla, Vedum, Sweden

Filed Sept. 10, 1956, Ser. No. 609,040

5 Claims. (Cl. 248—316)

My invention relates to an improvement in display racks and more particularly to brackets for pivotally supporting sign boards and other articles. The bracket is preferably adapted to be mounted on movable carriers such as doors, windows and vehicles.

One object of the invention is to provide a bracket combined with a clamping device which is easy to open for insertion of sign boards and other articles and by means of which the articles are pivotally supported in order that the supported article may be adjusted to any desired position.

Other objects and advantages of the invention will become more apparent during the course of the following description, when taken in connection with the accompanying drawings.

In the drawings:

Fig. 1 is a front view of one embodiment of the supporting device.

Fig. 2 is a side view of the same device.

Fig. 3 shows the clamping member.

Fig. 4 shows in the same manner as Fig. 3 the clamping members belonging to a second embodiment of the supporting device.

Figs. 5 to 8 show in end view clamping members with different clamping surfaces.

The supporting device as shown in Figs. 1 and 2 consists of a two-legged supporting fork 1 of resilient material, the two legs of said fork being designated by 2 and 3. Said two legs are connected to each other by means of a straight base end 4 having circular cross section. Disposed on said base end 4 is a hinge 7 with screw holes 6 for mounting the bracket on movable carriers such as doors and the like and near said base end a ledge 5 is arranged for said hinge for securing the supporting device to the carrier of the same, the ledge 5 being then clamped between the hinge and the carrier. The hinge may be separately secured to the carrier for pivotally mounting of the bracket.

The outer end of each leg 2 and 3 is provided with a pivotal pin 9 and 10 respectively, which pins are directed from each other and inserted in eyes 12 and 13. The outer ends of the pins are threaded and provided with nuts 11. Said eyes are secured to a clamping device 14. Between the nut 11 and the appertaining eye 12, 13 is disposed a washer 15 of leather, rubber or the like. The pins 9 and 10 are pivoted, under suitable coupling pressure and under suitable friction, to the surface of the corresponding eye so that the two legs 2, 3 are connected to the clamping device without play. Fig. 1 shows, by means of dashed lines 18, the legs in slack position, thus without being in coupling engagement with the eyes 12 and 13. The clamping device 14 which due to the friction of the pivots is held against undesired rotation, may be adjusted by hand to any angular position in relation to the bracket 1.

The clamping device is shown in Fig. 1 as seen from the side facing the bracket, i.e. in a plane perpendicular to the plane of Fig. 1. The clamping device consists of two registering rails or rods 22 and 23 which, according to the example shown, are straight and parallel with each other and rectangular in cross section. The eye 12 is secured to the rod 22 and the eye 13 to the rod 23.

The two rods 22 and 23 are connected to each other by means of two U-shaped links 25 arranged outside the two eyes 12 and 13. The shanks of said links are mutually parallel and inserted in bores, forming pivotal pins. The one rod may in this manner be displaced in longitudinal direction parallel with the other. In the position shown in Figs. 1 and 2, the resilient legs 2 and 3 strive to spread apart and they exert a pressure upon the bars in their opposite longitudinal directions. Due to the mutual connection of the bars by means of the links 25, which in said position are set at an acute angle to the bars, said pressure is transformed into a pressure transverse to the bars, whereby the bars are held tightly together. The clamping device is opened, when the two resilient legs 2 and 3 are pushed toward each other from the position shown in Fig. 1. Fig. 3 illustrates the clamping device in said open position, in which the distance between the two eyes 12 and 13 is reduced. The links 25 are perpendicular to the rods. When the legs 2 and 3 are released and return to the position shown in Figs. 1 and 2 the device is closed so that the rods 22 and 23 can clasp the sign board or the like under the spring action of the bracket.

The rod 22 is provided with two nails 26 arranged to engage bores 27 in the rod 23 when the clamping device is closed.

The rods may have any desired cross section, especially concerning the clamping surfaces as shown in Figs. 5 to 8. According to Fig. 7 the clamping surfaces 28 are rifled or corrugated. In Fig. 8 the rods are formed with grooves 29 which in the closed position of the clamping device form a channel with rectangular cross section adapted to receive a rod member with square, polygonal or circular section, e.g. a frame piece secured to the sign board. As illustrated in Figs. 5, 6 and 8 the front edge 30 of the clamping surfaces are cut obliquely which facilitates the insertion of the sign board in the clamping device.

In the end surfaces of the rods 22 and 23 bores 31 are provided.

The clamping members need not be straight rods or the like. They may have angularly arranged end portions or they may, throughout their length, have such a form that the clamping surfaces follow a waving line or a curved line. This embodiment is illustrated in Fig. 4 wherein two curved clamping members 32 and 33 are connected with each other by means of links 25 in the manner described above. Sign boards made of thin paper will be stiffened when inserted in the clamping device according to Fig. 4.

In order to lock the clamping device in closed position or in any other position locking members are arranged to prevent the rotation of the shanks of the links 25. According to the example shown in Fig. 3 the locking members consist of a screw 34 and a pin 35 inserted in a threaded hole at the end of the bar 23. The pin 35 may in this manner be pressed against the shank of the link 25 which thus is maintained in a fixed position. The end portion 36 of the screw 34 has a notch or recess for a special key.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

What I claim is:

1. A supporting clamp for sign boards and the like, comprising a pair of spaced resilient legs, a pair of parallel jaw units, said units being rod shaped and disposed in the same plane as the resilient legs, a pair of links pivotally connected at their opposite ends to the jaw units; said links having the same length and being disposed in spaced parallel relation, a pivot pin formed integrally with the terminal end of each of the resilient legs, a circular eye provided on each of the jaw units, the pins and the eyes forming a pivotal connection between the legs and the jaw units, and said legs exerting a resilient pressure upon said jaws in opposite longitudinal directions thereof in an effort to close said jaws.

2. A supporting clamp for sign boards and the like, comprising a pair of spaced resilient legs, a pair of parallel jaw units, said units being rod shaped and disposed in the same plane as the resilient legs, a pair of U-shaped links, the shanks of which being inserted in the jaw units as pivotal pins, said links having the same length and being disposed in spaced parallel relation, a pivot pin formed integrally with the terminal end of each of the resilient legs, a circular eye provided on each of the jaw units, the pins and the eyes forming a pivotal connection between the legs and the jaw units, and said legs exerting a resilient pressure upon said jaws in opposite longitudinal directions thereof in an effort to close said jaws.

3. A supporting clamp as claimed in claim 1 wherein the pivot pins of the resilient legs are directed from each other, the outer end of each pivot pin being provided with a washer of resilient material clamped between a nut and the appertaining circular eye of the jaw unit.

4. A supporting clamp as claimed in claim 2 wherein locking members are disposed in frictional engagement with the shanks of the U-shaped pins, said pins being circular or polygonal in cross section.

5. A supporting device for a display sheet comprising in combination: two longitudinal clamping jaws for grasping said sheet between themselves, a pair of equally long links pivotally connected to said jaws at equidistant points thereof so as to maintain said jaws in parallel relation to each other, two spaced resilient attachment legs, either one of said legs being pivotally connected to a separate one of said jaws and said legs being adapted to force said jaws in opposite longitudinal directions thereof, whereby said jaws are resiliently closed.

References Cited in the file of this patent

UNITED STATES PATENTS

| | | |
|---|---|---|
| 2,529,686 | Green | Nov. 14, 1950 |
| 2,714,728 | Block | Aug. 9, 1955 |

FOREIGN PATENTS

| | | |
|---|---|---|
| 73,293 | Denmark | Oct. 15, 1951 |
| 643,025 | Germany | Mar. 22, 1937 |